(12) United States Patent
Dettinger et al.

(10) Patent No.: US 8,302,021 B2
(45) Date of Patent: *Oct. 30, 2012

(54) POINTER DRAG PATH OPERATIONS

(75) Inventors: Richard Dean Dettinger, Rochester, MN (US); Daniel Paul Kolz, Rochester, MN (US); Shannon Everett Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 762 days.

This patent is subject to a terminal disclaimer.

(21) Appl. No.: 12/173,153

(22) Filed: Jul. 15, 2008

(65) Prior Publication Data

US 2008/0270926 A1    Oct. 30, 2008

Related U.S. Application Data

(63) Continuation of application No. 11/012,907, filed on Dec. 15, 2004, now abandoned.

(51) Int. Cl.
  *G06F 3/048* (2006.01)
(52) U.S. Cl. .................. 715/769; 715/856
(58) Field of Classification Search .......... 715/769, 715/856, 837, 770, 845
See application file for complete search history.

(56) References Cited

U.S. PATENT DOCUMENTS

| | | | |
|---|---|---|---|
| 4,772,882 A | 9/1988 | Mical | |
| 5,428,734 A | 6/1995 | Haynes et al. | |
| 5,608,860 A | 3/1997 | Fitzpatrick et al. | |
| 5,638,505 A | 6/1997 | Hemenway et al. | |
| 5,801,699 A | 9/1998 | Hocker et al. | |
| 6,191,807 B1 | 2/2001 | Hamada et al. | |
| 6,570,597 B1 | 5/2003 | Seki et al. | |
| 6,639,612 B2 | 10/2003 | Bosma et al. | |
| 6,883,145 B2 | 4/2005 | Jaeger | |
| 6,976,224 B2 | 12/2005 | Nii | |
| 7,454,717 B2 | 11/2008 | Hinckley et al. | |
| 7,770,125 B1 | 8/2010 | Young et al. | |
| 2003/0132967 A1 | 7/2003 | Gangadharan | |
| 2003/0222915 A1* | 12/2003 | Marion et al. | 345/769 |
| 2004/0004638 A1 | 1/2004 | Babaria | |
| 2004/0027383 A1 | 2/2004 | Jaeger | |
| 2004/0255269 A1 | 12/2004 | Santori et al. | |
| 2005/0060653 A1 | 3/2005 | Fukase et al. | |
| 2005/0154997 A1 | 7/2005 | Brun-Cottan et al. | |
| 2007/0016872 A1 | 1/2007 | Cummins et al. | |
| 2007/0157097 A1 | 7/2007 | Peters | |

FOREIGN PATENT DOCUMENTS

WO    WO03/104977 A2    12/2003

\* cited by examiner

*Primary Examiner* — Omar Abdul-Ali

(74) *Attorney, Agent, or Firm* — Martin & Associates, LLC; Derek P. Martin

(57) ABSTRACT

A graphical user interface allows performing operations simply by dragging a first object over a second object. One or more attributes of the second object are effectively "picked up" by virtue of dragging over the second object. In this manner, the user interface is more friendly, more intuitive, and reduces the number of pointer clicks to implement a particular function, thereby enhancing the efficiency of the user.

4 Claims, 6 Drawing Sheets

POINTER DRAG PATH OPERATIONS

CROSS-REFERENCE TO PARENT APPLICATION

This patent application is a continuation of U.S. Ser. No. 11/012,907 filed on Dec. 15, 2004, which is incorporated herein by reference.

BACKGROUND OF THE INVENTION

1. Technical Field

This invention generally relates to computer systems and more specifically relates to graphical user interfaces for computer systems.

2. Background Art

Early computer systems used command-based operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI), including IBM's OS/2, Microsoft Windows, and the Apple McIntosh. Software applications with graphical user interfaces soon followed, and the vast majority of computer programs running on personal computers today include a user-friendly graphical user interface.

Most graphical user interfaces provide many similar features. The basic display area in a graphical user interface is known as a window. A single window may fill the entire display, or the display can be split into a number of different windows. Most graphical user interfaces provide a menu bar that provides several drop-down lists of commands the user can perform. Various toolbars may also be provided that are customized to performing certain tasks within the computer program. A pointing device such as a trackball or a mouse is generally used to select various commands and options by clicking on the appropriate buttons on the menu bar, tool bar, or by selecting particular objects or portions of a window. Many operations in known graphical user interfaces may be performed by selecting an object by pressing a pointer button, holding the pointer button down while moving the object to a desired location, and dropping the object at the desired location by releasing the pointer button. The moving of an object while holding a pointer button down is commonly referred to as "dragging" the object. For example, a user can delete a file by selecting a file icon by pressing a pointer button, dragging the file icon to a recycle bin icon or a trash can icon, then releasing the pointer button to drop the file icon onto the recycle bin or trash can. A user can move a file by selecting a file icon and dragging the file icon to a new directory, then releasing the pointer button to drop the file icon onto the new directory. Both of these example relates to moving a file, but do not allow performing operations on the file without moving the file. These and other operations that allows a user to drag an object in a graphical user interface are known in the art.

While using a pointer is a very convenient way to navigate a graphical user interface, the user still must make multiple pointer clicks to perform most operations in ways that are often not intuitive or easy to perform. For example, if the user desires to combine two logical expressions A and B with a logical operator AND, the user could select the first logical expression A with a pointer click, select the second logical expression B with a pointer click, then click on an AND button to logically AND these two logical expressions together. This sequence of operations is different than the way a human user looks at the logical expression A AND B. As a result, a user's efficiency may be negatively affected by the current user interfaces known in the art. Without a mechanism that simplifies the use of a graphical user interface, users will have to continue using outdated graphical user interfaces that require an excessive number of pointer clicks to accomplish a desired task and that do not support performing computer tasks in a quick and intuitive fashion.

DISCLOSURE OF INVENTION

According to the preferred embodiments, an apparatus and method for a graphical user interface allow performing operations simply by dragging a first object over a second object. One or more attributes of the second object are effectively "picked up" by virtue of dragging over the second object. In this manner, the number of pointer clicks to implement a particular function may be reduced and operations may be performed in a more intuitive manner, thereby enhancing the efficiency of the user. In a first embodiment, the first object is an operand, and the second object is an operator. The operand may be dragged and dropped on the operator, or vice versa. The result is the application of the operator to the operand. In a second embodiment, there are first and second operands, and one operator. The first operand may be dragged across the one operator, then dropped on the second operand. The result is the application of the one operator to the two operands. In a third embodiment, there are multiple operands and multiple operators. One or more operands may be dragged across one or more operators, then dropped on one or more operands. The result is the application of the operators to the operands. The preferred embodiments thus provide a way to perform functions in a graphical user interface in a way that is faster, more intuitive, and uses fewer pointer clicks than is possible in the prior art.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide pointer drag path operations that enhance the power of a graphical user interface by picking up one or more attributes of a second object as a first object is dragged across the second object. Three distinct embodiments are disclosed herein. In the first embodiment, a single operand and a single operator are present, and one can be dragged and dropped on the other. In the second embodiment, multiple operands and a single operator are present, and one of the operands can be dropped on the other operand, possibly after dragging on the operator. In the third embodiment, multiple operands and multiple operators are present, and a drag path may include one or more operands and one or more operators. In all of the embodiments, dragging an object across another object results in the dragged object "picking up" one or more attributes of the object that was dragged across, resulting in enhanced functionality through dragging without requiring explicit pointer clicks in a manner that is more intuitive to a user.

Figure 1:
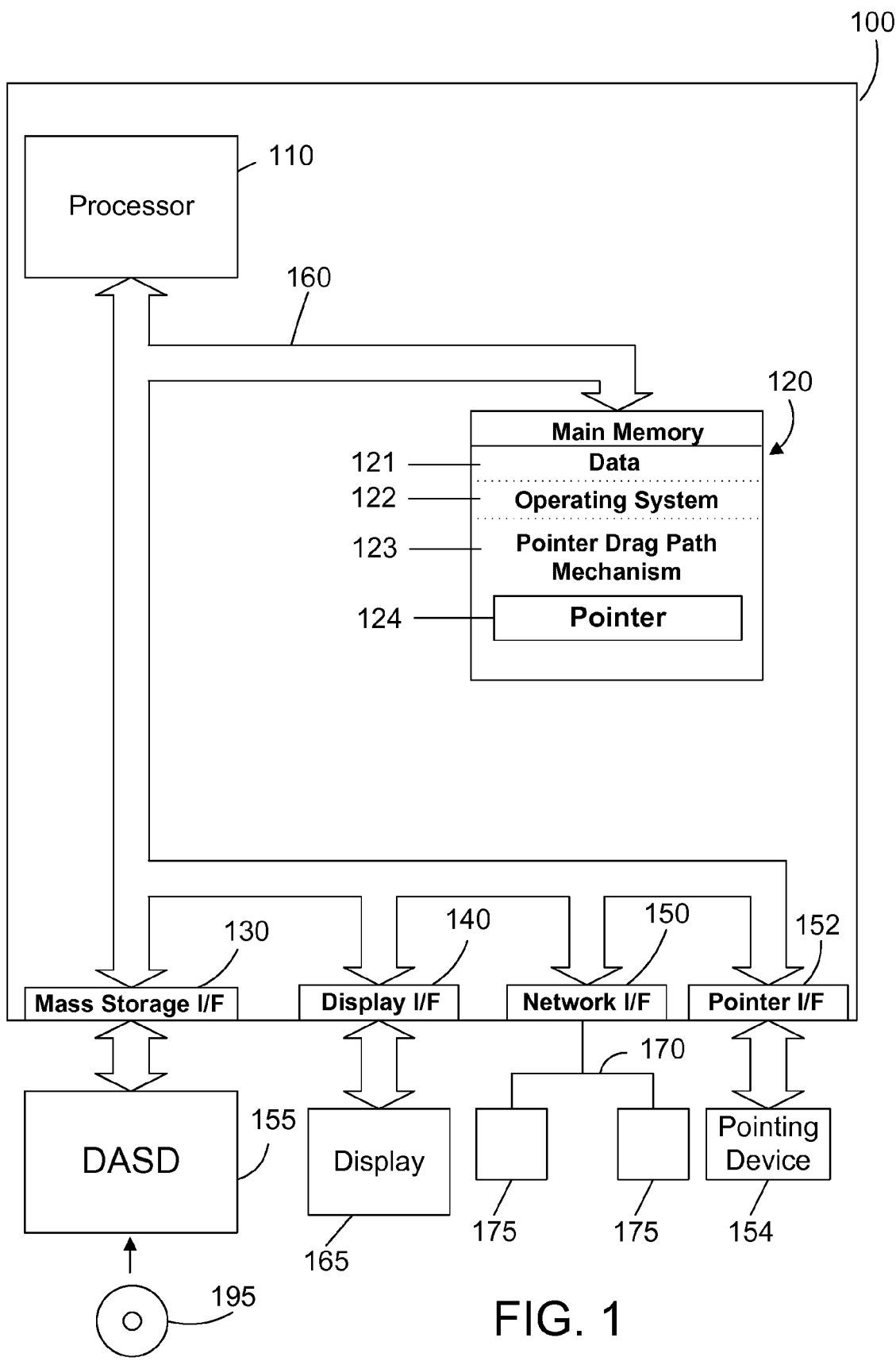
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and methods of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, a network interface 150, and a pointer interface 152. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, and a pointer drag path mechanism 123. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Pointer drag path mechanism 123 provides enhanced functionality for the operating system 122 and for applications running on the computer system 100 by allowing the dragging of an object in a GUI to "pick up" attributes of other objects that are dragged across using a pointer 124 that is generated and controlled by a suitable pointing device 154 (e.g., mouse or trackball) coupled to the pointer interface 152. The function of the pointer drag path mechanism 123 is shown in more detail below with reference to FIGS. 2-17.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122 and pointer drag path mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, pointer interface 152, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Pointer interface 152 is used to connect a pointing device 154 (such as a mouse or trackball) to computer system 100. A user may use the pointing device 154 to select an object in a graphical user interface. Once an object is selected, it may be dragged by moving the object while selected to change the object's location in the graphical user interface. While the mouse is the most commonly-used pointing device in use today, the preferred embodiments expressly extend to any and all pointing devices, whether currently known or developed in the future.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

In the discussion that follows, the term "mouse click" is used to denote one example of a specific way to perform a pointer selection of a GUI object within the scope of the preferred embodiments. The preferred embodiments expressly extend to any type of pointing device and any type of mechanism for selecting an object in a graphical user interface, including switch closures, optical detectors, voice commands, or any other way for selecting an object in a GUI, whether now known or developed in the future.

Figure 2:
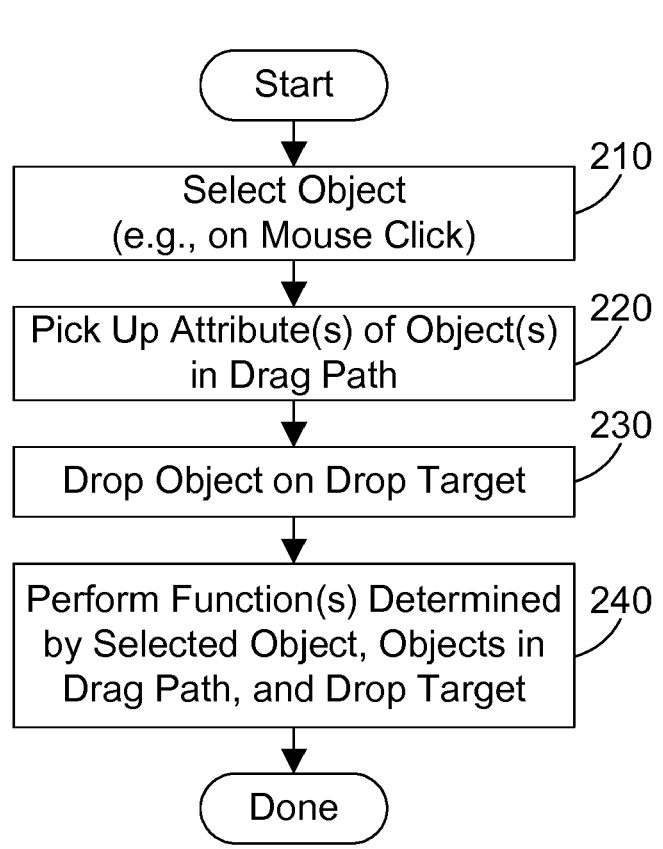
FIG. 2 is a flow diagram of a method for performing pointer drag path operations in accordance with the preferred embodiments.

Referring to FIG. 2, a method 200 is representative of a broad method that encompasses all three specific embodiments disclosed herein. Method 200 is preferably performed by the pointer drag path mechanism 123 in FIG. 1. First, an object is selected, such as when a mouse pointer is clicked on the object in a graphical user interface (step 210). Once the object is selected, the object may be dragged across another object, which causes the dragged item to pick up one or more attributes of one or more objects in the drag path of the selected object (step 220). The object is then dropped on a drop target (step 230). Note that the drop target can be the object that was originally selected, the object that was dragged across, a different (third) object, or a defined location in the GUI window. Once the object is dropped on the drop target, one or more functions are performed, which functions are determined by the clicked object, objects in the drag path, and the drop target (step 240). In this manner, a selected object may pick up one or more attributes of one or more objects that are dragged across by the selected object, and may perform one or more functions that depend on those one or more attributes, without the user explicitly clicking on or otherwise selecting any of the objects that were dragged across. The result is a graphical user interface that allows dragging of an object to define functions on the object without explicitly clicking or selecting those functions in a way that is quicker and more intuitive to the user. The mere dragging of a selected object across another object allows a function to be determined, in many cases without further input from the user.

Figure 3:
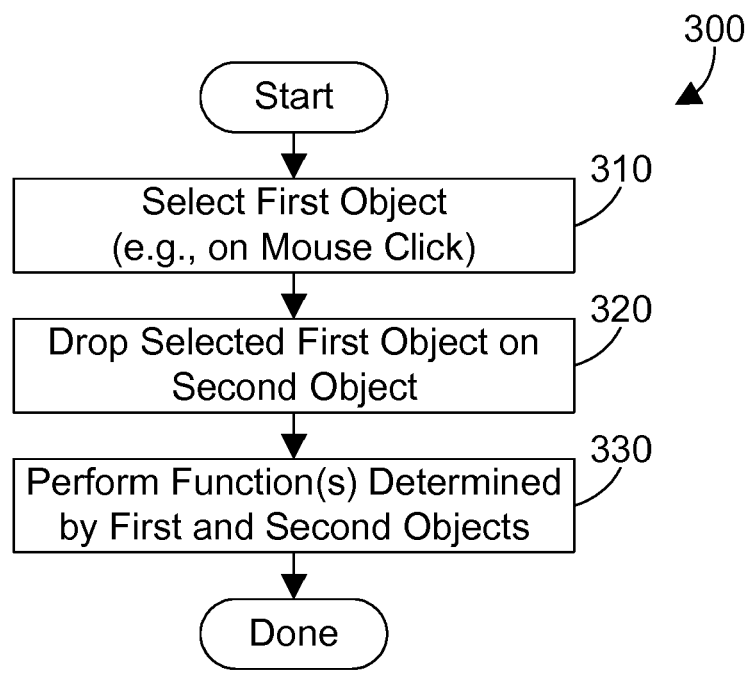
FIG. 3 is a flow diagram of a method for performing pointer drag path operations in accordance with the first embodiment.

We now present three specific exemplary embodiments of the broad method 200 in FIG. 2. Referring to FIG. 3, a method 300 in accordance with the first embodiment selects a first object, such as when a mouse pointer is clicked on the object (step 310). The selected first object is then dropped on a second object (step 320). Note that the second object in step 320 corresponds to the "drop target" in step 230 in FIG. 2. One or more functions are then performed that are determined by the first object and the second objects (step 330). The first embodiment addresses unary operations that involve a single operator and a single operand.

The discussion herein is couched in terms of "operators" and "operands". An operator is broadly defined herein to mean anything that can perform a function of any kind on some operand. An operand is broadly defined herein to mean anything that can be acted upon by some operator. A simple mathematical example is 2+3. The numbers 2 and 3 are operands, and the addition sign is the operator. A simple logical example is A OR B. The items A and B are operands, and the OR is the operator that performs a logical "or" function of operands A and B. One skilled in the art will realize that the preferred embodiments extend to any and all operands and any and all operators, whether currently known or developed in the future.

Figure 4:
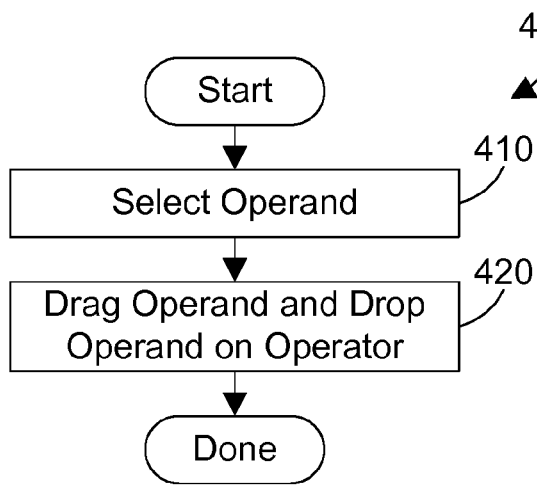
FIG. 4 is a flow diagram of a first particular method in accordance with the first embodiment.
Figure 5:
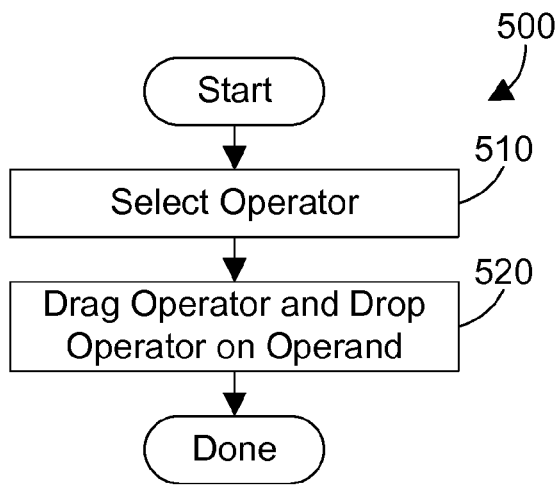
FIG. 5 is a flow diagram of a second particular method in accordance with the first embodiment.

In method 300 in accordance with the first embodiment, one of the two objects is preferably an operand, and the other of the two objects is preferably an operator. These two different cases for method 300 in FIG. 3 are shown in FIGS. 4 and 5. In method 400 in FIG. 4, the object that represents an operand is selected (step 410), and is dragged and dropped onto an object that represents an operator (step 420). One example of the function in FIG. 4 is shown in window 600 in FIG. 6. In this example, the user clicks on the object 610 entitled "file1.doc" with the mouse pointer to select the file1.doc object, then drags the file1.doc object 610 to the "Compress" button (or object) 620, and drops the file1.doc object 610 onto the Compress button 620. As a result of dropping the file1.doc object 610 onto the Compress button 620, the pointer drag path mechanism of the first embodiment compresses the file "file1.doc". In other words, the object 610 "picks up" the function of the "Compress" button 620 by virtue of dragging over and dropping on the Compress button 620.

In method 500 in FIG. 5, the object that represents an operator is selected (step 510), and is dragged and dropped onto an object that represents an operand (step 520). One example of the function in FIG. 5 is shown in window 700 in FIG. 7. In this example, the user clicks on the "Compress" button 620 to select the compress button 620, drags the compress button 620 up to the file1.doc object 610, then drops the compress button 620 onto the file1.doc object 610. As a result of dropping the Compress button 620 onto the file1.doc object 610, the pointer drag path mechanism of the first embodiment compresses the file "file1.doc". In other words, the object 620 "picks up" the attribute of the file1.doc object 610 by virtue of dragging and dropping the Compress object 620 on the file 1.doc object 610.

Figure 6:
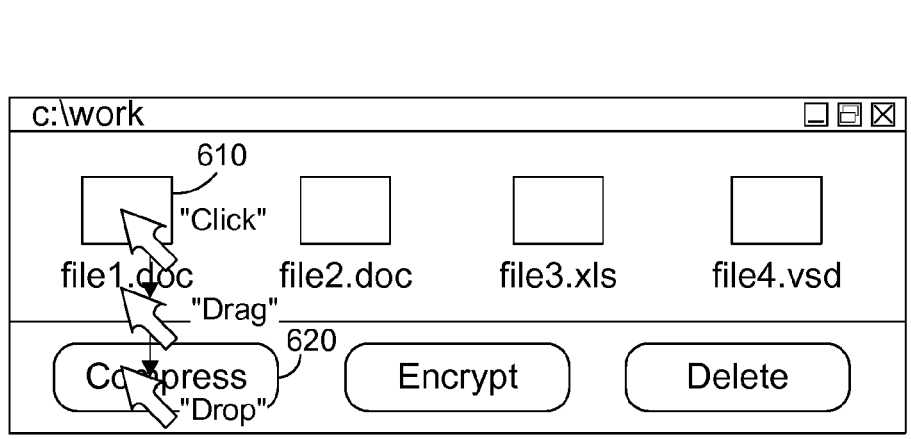
FIG. 6 is a diagram of a sample GUI window illustrating the method shown in FIG. 4.
Figure 7:
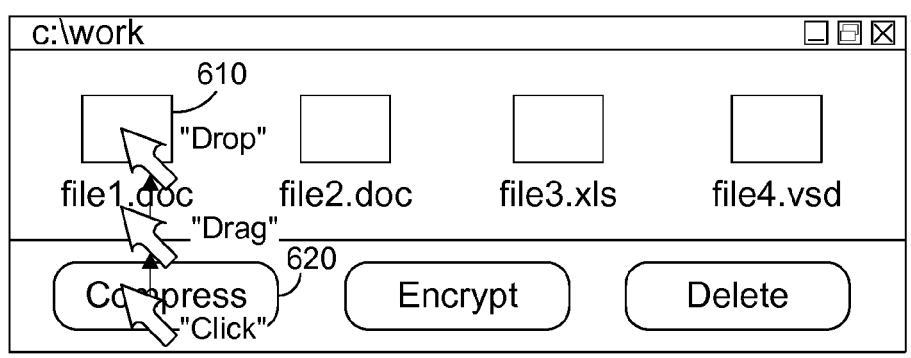
FIG. 7 is a diagram of a sample GUI window illustrating the method shown in FIG. 5.

The two specific examples in FIGS. 6 and 7 illustrate the general concept of picking up one or more attributes of an object that is dragged across. This language of "picking up" one or more attributes of an object that is dragged across is not language that is common or known in the art, but is coined herein to mean in a broad sense adding any attribute of the object that is dragged across to the object being dragged.

Note that the object being dragged across may include a defined region that must be contacted by the dragged object to pick up one or more attributes of the object being dragged across. This defined region may be the outline of the graphical icon for the object in the graphical user interface, or may be some region that is larger or smaller that the graphical icon for the object. In addition, the defined region may have any suitable shape, including shapes related to the shape of the icon and other unrelated shapes as well. The term "attribute" is used herein in its broadest sense to include any aspect that is related in any way to a GUI object or to the underlying entity represented by the GUI object.

In the alternative, a selected object that is being dragged must come within a defined proximity of the object being dragged across. This is alternative way to define a region which must be contacted by the object being dragged in order for the object being dragged to pick up one or more attributes of an object corresponding to the defined region. For example, the region could be defined by the outline of the icon of the object being dragged across, plus some defined space around the icon. In the alternative, the region could be defined in simple Cartesian coordinates. Note that the defined region may be smaller than the icon, the same size as the icon, or larger than the icon. Note also that the term "dragged across" as used herein includes any touching of an object or defined region corresponding to an object, regardless of whether or not the drag path completely traverses the object or defined region, and that a first object is in a drag path of a selected object if any defined region corresponding to the selected object touches any defined region corresponding to the first object during the dragging of the selected object.

Figure 8:
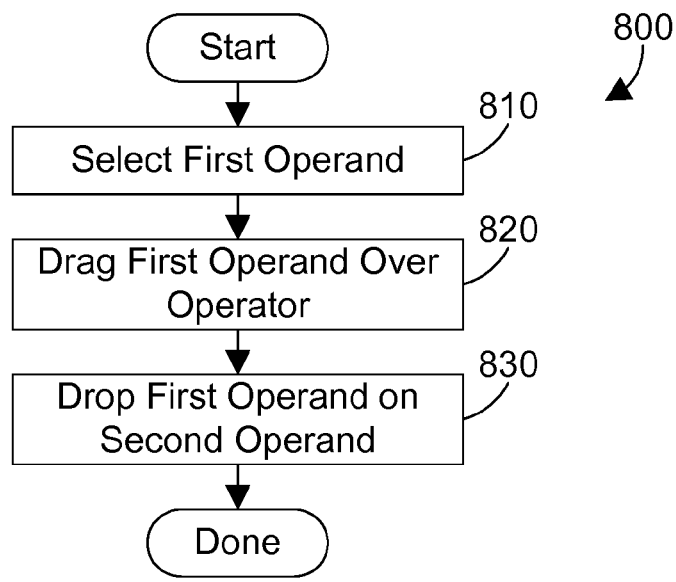
FIG. 8 is a flow diagram of a first particular method in accordance with the second embodiment.
Figure 9:
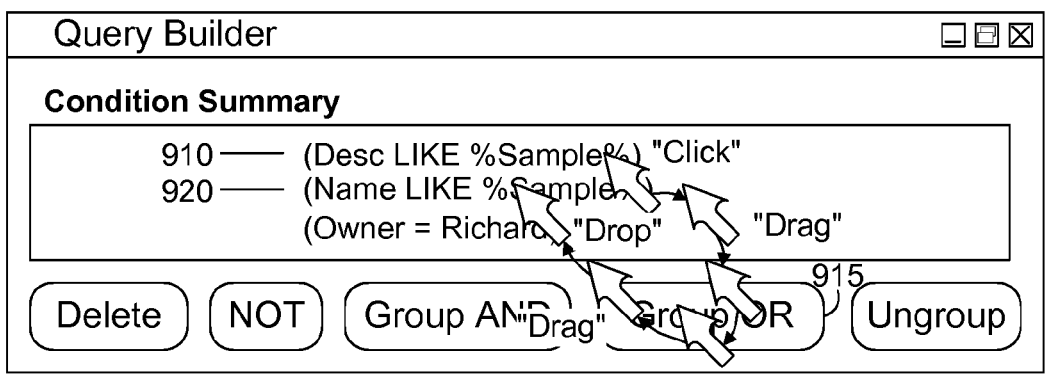
FIG. 9 is a diagram of a sample GUI window illustrating the method shown in FIG. 8.
Figure 10:
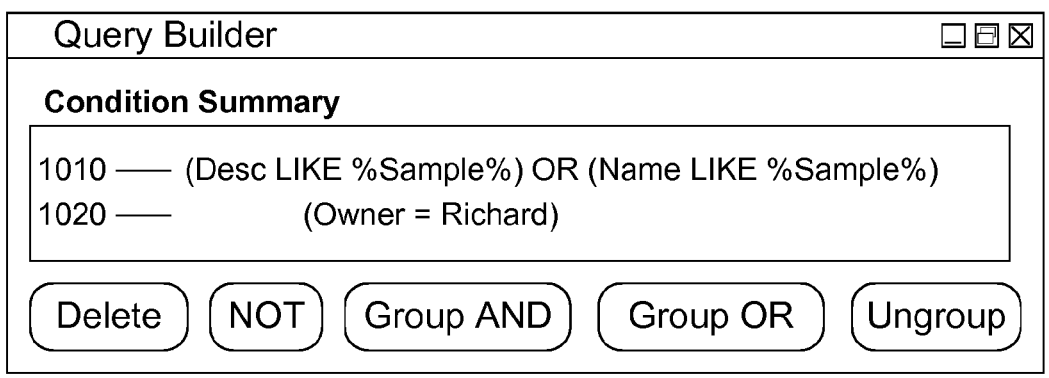
FIG. 10 is a diagram of the sample GUI window of FIG. 9 after clicking, dragging, and dropping the object as shown in FIG. 9.

In a second embodiment, two operands are operated upon by one operator. There are multiple ways for the pointer drag path mechanism of the second embodiment to function. A first way is shown in FIGS. 8-10. Referring to method 800 in FIG. 8, the first operand is clicked on to select the first item (step 810). The selected first operand is then dragged over an operator (step 820). The first operator is then dropped onto a second operand (step 830). One example of the function of FIG. 8 is shown in window 900 in FIG. 9. Window 900 is representative of a window that could be displayed by a graphical query builder for a database. In this example, the user clicks on the first entry 910, drags the selected first entry 910 across the "Group OR" button 915, and drops the selected entry onto the second entry 920. As a result of dropping the first entry 910 onto the second entry 920 after dragging the first entry 910 across the "Group OR" button 915, the pointer drag path mechanism of the second embodiment performs a logical OR function on the operands represented by objects 910 and 920. The result is shown in FIG. 10, where an entry 1010 is shown that is the logical OR of the two entries 910 and 920 shown in FIG. 9.

Figure 11:
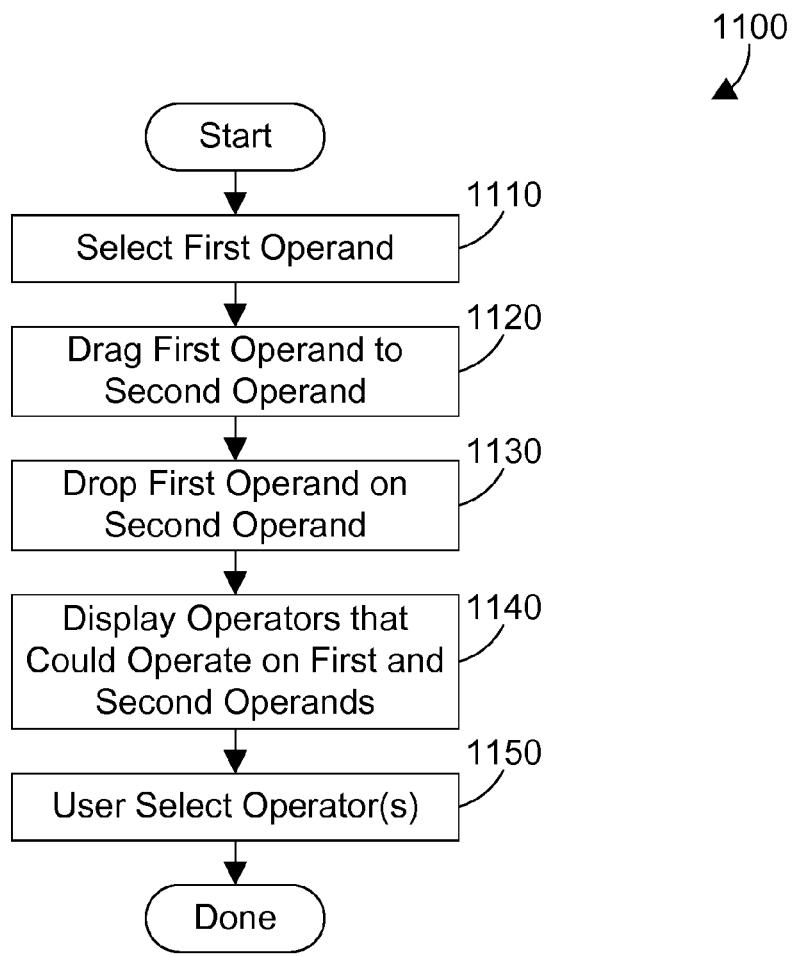
FIG. 11 is a flow diagram of a second particular method in accordance with the second embodiment.
Figure 12:
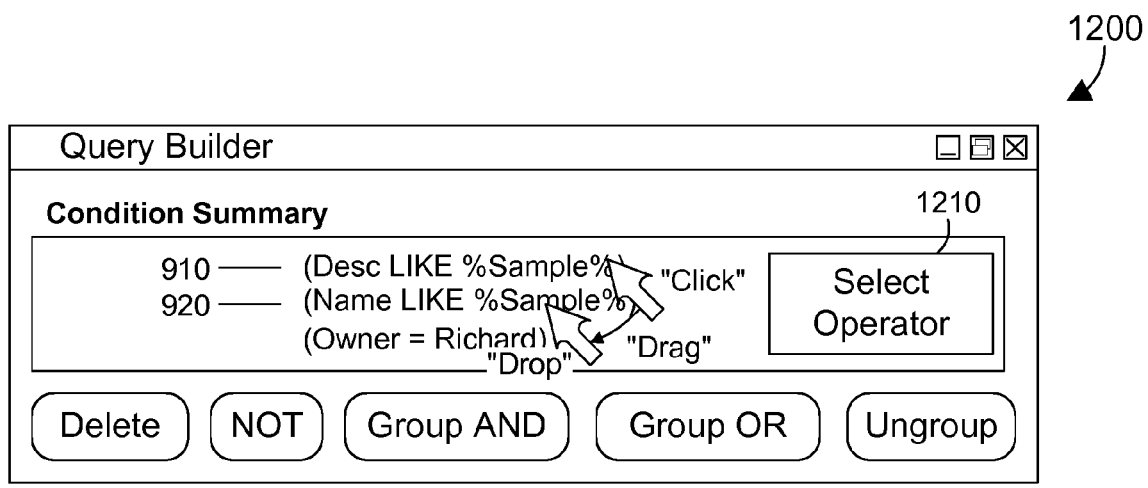
FIG. 12 is a diagram of a sample GUI window illustrating the method shown in FIG. 11.

A second way for the pointer drag path mechanism of the second embodiment to function is shown in FIGS. 11 and 12. Referring to method 1100 in FIG. 11, the first operand is selected by clicking on the object corresponding to the first operand (step 1110). The first operand is dragged to the second operand (step 1120), and is dropped on the second operand (step 1130). At this point, the GUI knows that some operation needs to be performed on these two operands, but because the first operand was not dragged across an operator object before dropping the first operand onto the second operand, the mouse drag path mechanism has no idea what operator the user wants to use. As a result, the mouse drag path mechanism displays to the user the operators that could operate on the first and second operations (step 1140). The user then selects from the displayed operators one or more desired operators (step 1150).

One example of the function of method 1100 in FIG. 11 is shown in window 1200 in FIG. 12. In this example, the user clicks on the first entry 910, drags the first entry 910 to the second entry 920, and drops the first entry 910 onto the second entry 920. As a result of dropping the first entry 910 onto the second entry 920 without dragging the first entry across an operator, the pointer drag path mechanism prompts the user to select one or more appropriate operators. Thus, the "Select Operator" prompt 1210 is displayed to the user. Note that the available operations are all listed in the buttons at the bottom of window 1200, so the user can simply select one or more of the buttons as the appropriate operator for the selected operands 910 and 920. In other examples, the available operators may not be visible within the window. In this case, the prompt to the user may include a list of available operators, allowing the user to select from the list which operator(s) should be applied to the selected operands 910 and 920.

Figure 13:
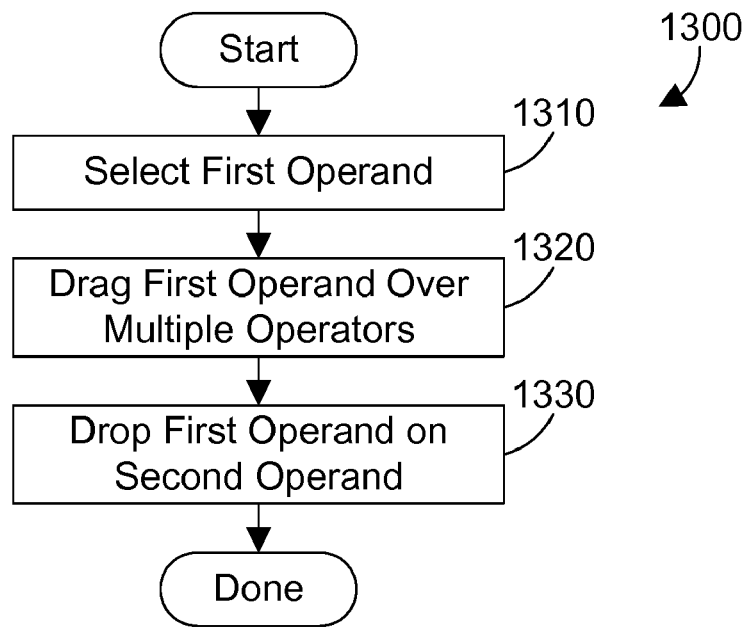
FIG. 13 is a flow diagram of a first particular method in accordance with the third embodiment.
Figure 14:
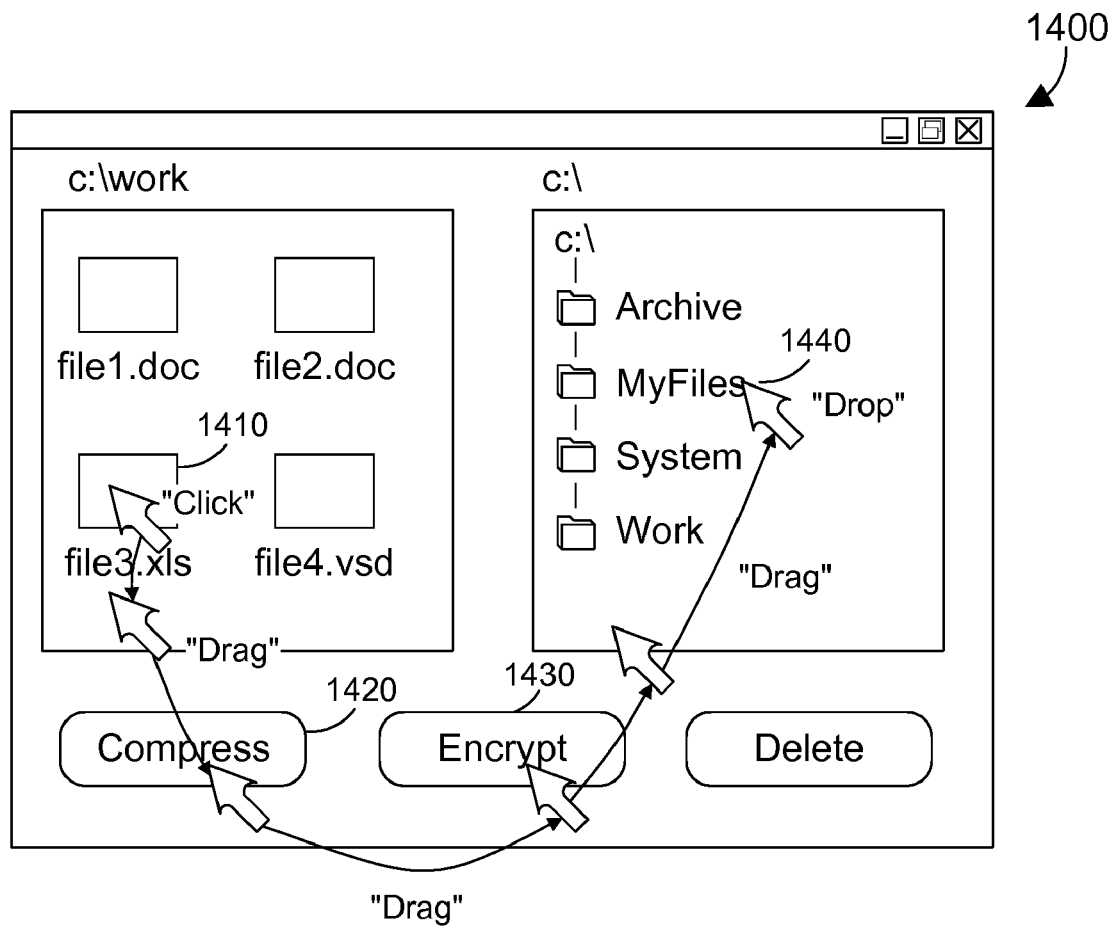
FIG. 14 is a diagram of a sample GUI window illustrating the method shown in FIG. 13.

In a third embodiment, multiple operands are operated upon by multiple operators. One way for the pointer drag path mechanism of the third embodiment to function is shown in FIGS. 13-14. Referring to method 1300 in FIG. 13, a first operand is selected (step 1310), the first operand is then dragged over multiple operators (step 1320), and dropped on a second operand (step 1330). As the first operand is dragged over the objects corresponding to the operators in step 1320, the pointer drag path mechanism picks up the function of each operator without the user clicking on the pointer.

One example of the function of method 1300 in FIG. 13 is shown in window 1400 in FIG. 14. The user clicks on the object "file3.xls" 1410, drags the object 1410 across the Compress button 1420, continues to drag the object 1410 across the Encrypt button 1430, and drops the object 1410 on the MyFiles folder 1440. As the object 1410 is dragged across the buttons 1420 and 1430, the pointer drag path mechanism picks up the functions of those buttons, and knows when the object 1410 is dropped onto the MyFiles folder 1440 that the file3.xls file should be compressed and encrypted as it is moved or copied to the MyFiles directory 1440. This is one specific example of how attributes (in this case, operator functions) of an object that is in the pointer drag path may be picked up in accordance with the preferred embodiments.

Note that the preferred embodiments extends to dragging any object across a different object, even if the different object is in a different window in the graphical user interface, and even if the different object is in a window that corresponds to a different software application.

The preferred embodiments provide a pointer drag path mechanism that allows a user of a graphical user interface to select an object, then pick up one or more attributes of an object that is in the drag path of the selected object. The preferred embodiments described herein include a single operator and a single operand (first embodiment), a single operator and two operands (second embodiment), and multiple operators and multiple operands (third embodiment). By picking up attributes of objects in the drag path, the simple action of dragging an object over other objects results in performing multiple functions with a single mouse click that would normally take multiple mouse clicks using known GUIs and in a way that is faster and more intuitive than provided in known GUIs.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
 at least one processor;
 a memory coupled to the at least one processor; and
 a pointer drag path mechanism residing in the memory and executed by the at least one processor, the pointer drag path mechanism comprising a pointer that allows a user to select an existing first object that represents a first operator by performing a pointer selection, the pointer drag path mechanism picking up while the pointer remains selected from selecting the first object at least one attribute from a second object without the user performing any additional pointer selection or deselection, the second object representing a first operand that is in a drag path of the first object while the first object remains selected by the pointer, and dropping the first object onto a third object by performing a pointer deselection, thereby operating on the first operand with the first operator, wherein the third object represents a second operand and the dropping of the first object onto the third object by performing a pointer deselection results in operating on the first and second operands with the first operator.

2. An apparatus comprising:

at least one processor;

a memory coupled to the at least one processor; and a pointer drag path mechanism residing in the memory and executed by the at least one processor, the pointer drag path mechanism comprising a pointer that allows a user to select a first object that represents a first operand by performing a pointer selection, the pointer drag path mechanism picking up while the pointer remains selected from selecting the first object at least one attribute of a second object without the user performing any additional pointer selection or deselection, the second object representing a first operator that is in a drag path of the first object while the first object remains selected by the pointer, and dropping the first object onto a third object by performing a pointer deselection, thereby operating on the first operand with the first operator, wherein the third object represents a second operand and the dropping of the first object onto the third object by performing a pointer deselection results in operating on the first and second operands with the first operator.

3. A computer-readable program product comprising:

a pointer drag path mechanism comprising a pointer that allows a user to select an existing first object that represents a first operator by performing a pointer selection, the pointer drag path mechanism picking up while the pointer remains selected from selecting the first object at least one attribute from a second object without the user performing any additional pointer selection, the second object representing a first operand that is in a drag path of the first object while the first object remains selected by the pointer, and dropping the first object onto a third object by performing a pointer deselection, thereby operating on the first operand with the first operator, wherein the third object represents a second operand and the dropping of the first object onto the third object by performing a pointer deselection results in operating on the first and second operands with the first operator; and computer-readable recordable media bearing the pointer drag path mechanism.

4. A computer-readable program product comprising:

a pointer drag path mechanism comprising a pointer that allows a user to select a first object that represents a first operand by performing a pointer selection, the pointer drag path mechanism picking up while the pointer remains selected from selecting the first object at least one attribute of a second object without the user performing any additional pointer selection or deselection, the second object representing a first operator that is in a drag path of the first object while the first object remains selected by the pointer, and dropping the first object onto a third object by performing a pointer deselection, thereby operating on the first operand with the first operator, wherein the third object represents a second operand and the dropping of the first object onto the third object by performing a pointer deselection results in operating on the first and second operands with the first operator; and computer-readable recordable media bearing the pointer drag path mechanism.

\* \* \* \* \*